(12) United States Patent
Neogi et al.

(10) Patent No.: US 7,953,713 B2
(45) Date of Patent: May 31, 2011

(54) SYSTEM AND METHOD FOR REPRESENTING AND USING TAGGED DATA IN A MANAGEMENT SYSTEM

(75) Inventors: Anindya Neogi, New Delhi (IN); Raghavendra Singh, New Delhi (IN); Ravi Kothari, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 11/531,897

(22) Filed: Sep. 14, 2006

(65) Prior Publication Data

US 2008/0071800 A1 Mar. 20, 2008

(51) Int. Cl.
*G06F 17/00* (2006.01)
(52) U.S. Cl. ......................... 707/694; 707/793
(58) Field of Classification Search .................. 707/694, 707/793
See application file for complete search history.

(56) References Cited

U.S. PATENT DOCUMENTS

| | | | | |
|---|---|---|---|---|
| 5,825,772 | A * | 10/1998 | Dobbins et al. | 370/396 |
| 5,862,325 | A * | 1/1999 | Reed et al. | 709/201 |
| 5,980,078 | A * | 11/1999 | Krivoshein et al. | 700/1 |
| 6,041,355 | A * | 3/2000 | Toga | 709/227 |
| 6,363,411 | B1 * | 3/2002 | Dugan et al. | 709/202 |
| 6,397,228 | B1 * | 5/2002 | Lamburt et al. | 707/203 |
| 6,484,161 | B1 * | 11/2002 | Chipalkatti et al. | 707/3 |
| 6,711,171 | B1 * | 3/2004 | Dobbins et al. | 370/400 |
| 2002/0069218 | A1 * | 6/2002 | Sull et al. | 707/501.1 |
| 2002/0099737 | A1 | 7/2002 | Porter et al. | |
| 2003/0009670 | A1 * | 1/2003 | Rhoads | 713/176 |
| 2003/0069881 | A1 * | 4/2003 | Huttunen | 707/5 |
| 2003/0191752 | A1 * | 10/2003 | Fairweather | 707/3 |
| 2003/0217139 | A1 * | 11/2003 | Burbeck et al. | 709/224 |
| 2004/0002958 | A1 * | 1/2004 | Seshadri et al. | 707/3 |
| 2004/0003132 | A1 * | 1/2004 | Stanley et al. | 709/316 |
| 2004/0093323 | A1 * | 5/2004 | Bluhm et al. | 707/3 |
| 2004/0225865 | A1 * | 11/2004 | Cox et al. | 712/34 |
| 2005/0004838 | A1 * | 1/2005 | Perkowski et al. | 705/14 |
| 2005/0050016 | A1 * | 3/2005 | Stanoi et al. | 707/3 |
| 2005/0144164 | A1 * | 6/2005 | Gorak et al. | 707/5 |
| 2005/0165852 | A1 | 7/2005 | Albornoz et al. | |
| 2005/0182777 | A1 | 8/2005 | Block et al. | |
| 2005/0235274 | A1 | 10/2005 | Mamou et al. | |
| 2005/0280540 | A1 * | 12/2005 | Muehl et al. | 340/572.4 |
| 2005/0283526 | A1 * | 12/2005 | O'Neal et al. | 709/223 |
| 2006/0224687 | A1 * | 10/2006 | Popkin et al. | 709/217 |
| 2007/0011184 | A1 * | 1/2007 | Morris et al. | 707/101 |

(Continued)

OTHER PUBLICATIONS

BitTorrent Protocol Specification v1.0, Oct. 2002, bittorrent.org, www.bittorrent.org/protocol.html.*

(Continued)

*Primary Examiner* — Charles Kim
*Assistant Examiner* — Kurt Mueller
(74) *Attorney, Agent, or Firm* — Gibb I.P. Law Firm, LLC; Derek S. Jennings

(57) ABSTRACT

Disclosed is a management system of a managed system. The management system includes a data sensor layer that interfaces with the managed system to collect raw data. The data sensors in the data sensor layer add semantic tags to the raw data to form tagged data. The semantic tags are maintained throughout the life cycle of the tagged data. The management system further includes a core engine for processing the tagged data based on the semantics tags.

16 Claims, 5 Drawing Sheets

U.S. PATENT DOCUMENTS

2007/0028133 A1* 2/2007 Izutsu et al. ............... 714/4
2007/0078832 A1* 4/2007 Ott et al. ................ 707/3
2008/0109881 A1* 5/2008 Dasdan ................. 726/4

OTHER PUBLICATIONS

BitTorrent Protocol Specification v1.0 (unofficial), Jan. 2, 2005, theroy.org, http://wiki.theory.org/BitTorrentSpecification/.*

Brian Cohen, "Incentives build robustness in BitTorrent", May 22, 2003, http://bitconjurer.org /BitTorrent/bittorrentecon.pdf.*

T. Klingberg, et al., "Gnutella 0.6". Gnutella, Jun. 2002, http://rfc-gnutella.sourceforge.net/src/rfc-0_6-draft.html.*

The Gnutella Protocol Specification v0.4 (Document Revision 1.2), Jun. 2001. http://www9.limewire.com/developer/gnutella_protocol_0.4.pdf.*

R. Navigli, and P. Velardi, "*Learning Domain Ontologies from Document Warehouses and Dedicated Web Sites*," Computational Linguistics, MIT press, (50)2, 2004.

R. Navigli, P. Velardi, A. Cucchiarelli, and Francesca Neri, "*Automatic Ontology Learning: Supporting a Per-Concept Evaluation by Domain Experts*," Proc. ECAI, 2002.

\* cited by examiner

SYSTEM AND METHOD FOR REPRESENTING AND USING TAGGED DATA IN A MANAGEMENT SYSTEM

FIELD OF THE INVENTION

The present invention relates generally to management systems and, in particular, to an improved management system architecture in which semantic tags are attached to data to facilitate the processing of data in a largely domain independent manner.

BACKGROUND

A management system is essential for the efficient operation of any large distributed computer system. A distributed computer system can be managed and monitored at various levels, such as an infrastructure level, a middleware level, and at applications level.

FIG. 1 shows a schematic block diagram of a typical architecture of a management system 100 for a managed system 190. The management system 100 includes a data sensors layer 110 that interfaces with the managed system 190 through native monitoring interfaces 195 to collect data. The data may be static, such as deployment descriptors, or dynamic, such as resource consumption and performance metrics.

The management system 100 further includes a base event generation and data aggregation layer 120 for processing the data collected by the data sensor layer 110 in order to compute aggregate data and/or to generate base events. The base events and aggregate data may be stored in a data repository 150.

The management system 100 further includes an event composition and filtering layer 130, which filters and composes events based on pre-defined rules to generate composite events. Finally, the management system 100 includes different system management applications 140, such as visualization, problem determination, planning, and other analytic applications, also using the data in the repository 150.

The management system 100 shown in FIG. 1 is driven by the data collected by data sensors 110. Each data sensor 110 is designed to interact with a specific component in the managed system 190, and is based on the nature and type of interaction that is meaningful and feasible for the given managed system component.

Semantic tags are used to give "meaning" to data. Semantics are traditionally designed into the higher layers of the management system 100, those being the base event generation and data aggregation layer 120, the event composition and filtering layer 130 and the system management applications 140. For example, consider the case where the data sensor layer 110 includes a data sensor that periodically checks the status of a port in the managed system 190. The output of that data sensor is a bit, with a "0" signifying that the port is "down" and a "1" signifying the port is "up". The semantics of what the output of that data sensor represents is designed into the higher level layers 120, 130 and 140. Consider further the case where the data sensor layer 110 includes a second sensor which checks if the queue size of the managed system 190 is within tolerable limits. That second sensor outputs a "1" if the queue size is within tolerable limits, and a "0" otherwise. Even though both data sensors output a "0" or a "1", the meanings of those output bits are different for each sensor. The higher level layers 120, 130 and 140 of the management system 100 have to differentiate the data collected from the different data sensors. Thus, programming is required at most of the layers 120, 130 and 140 of the management system 100 to interpret the data collected by the data sensors 110. For example, when modules are added in the data sensor layer 110, the higher layers 120, 130 and 140 need to be reprogrammed to "understand" the meaning of data output by such added modules. This "lack of localization" makes maintaining and enhancing the traditional management system 100 complex.

An article entitled "Learning Domain Ontologies from Document Warehouses and Dedicated Web Sites" by R. Navigli, and P. Velardi, published in Computational Linguistics, MIT press, (50)2, 2004 discloses the use of ontologies to express the inter-relationships between symbolic entities. Ontologies are often human created, though automated methods of building ontologies exist. One such an automated method of building ontologies is disclosed in R. Navigli, P. Velardi, A. Cucchiarelli, and Francesca Neri, "Automatic Ontology Learning: Supporting a Per-Concept Evaluation by Domain Experts," Proc. ECAI, 2002.

To illustrate the use of ontologies to express the inter-relationships between symbolic entities, consider as for example a symbolic entry "leukaemia", which is a type of cancer. However, the symbolic entity "leukemia" is just that, a symbolic entity, and a knowledge source (the ontology) is required for a computer to associate the symbolic entry "leukaemia" with a type of cancer. Within the context of natural language processing, bioinformatics, and other text processing domains, a considerable amount of work has been performed on ontologies. From another perspective, ontology is to natural language what objects are to object oriented computer programming. In object oriented computer programming there are "classes" which contain the data and the "methods" that operate on the data. Classes may be sub-classes of, or children of, other classes. Accordingly, a relationship between classes is established. However, in both the case of ontologies and in the case of object oriented computer programming the relationship is separate from the representation of the symbolic entity. For example, the fact that a class called "myclass" and another class called "cat" are related cannot be inferred from the representation of the classes (myclass and cat in this example). There has to be a separate registration of the fact that cat is a sub-class of myclass. Similarly the representations of "leukaemia" and "cancer" do not in any way reveal the inter-relationship between the two symbolic entities. The inter-relationship is separate from the representations of the symbolic entities themselves.

A need therefore exists for an improved management system in which modules can be added to a data sensor layer without the need to reprogram layers in which the data output by the new modules is used in order for those layers to "understand" the meaning of the data output by the added modules.

SUMMARY

It is an object of the present invention to substantially overcome, or at least ameliorate, one or more disadvantages of existing arrangements.

Disclosed are a management system of a managed system and a method performed in the management system. The management system includes a data sensor layer that interfaces with the managed system to collect raw data. The data sensors in the data sensor layer add semantic tags to the data. The semantic tags are maintained throughout the life cycle of the data.

Two types of semantic tags are disclosed. Core semantic tags are domain independent and may therefore be reused across multiple domains. Extension semantic tags are domain dependent and extend the core semantic tags by identifying the domain-specific parameter values and by adding a unique identification thereto. Hence, the extension semantic tags create particular instances of the core semantic tags.

The management system further includes a core engine for processing the tagged data based on the semantics tags.

Data sensors, and semantic tags associated with data captured by such data sensors, are added to the management system through localized programming.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION

A computer system and its components may be represented and analyzed as a multi-level and multi-node queuing system with inter-dependent nodes. The multiple levels may correspond to business, application, middleware, and infrastructure level views of the computer system. Nodes may have vertical dependencies across layers, and horizontal dependencies within a layer. Each node of the computer system may produce data. The data may broadly be classified into a finite number of metrics associated with a generic queuing system. These metrics are independent of the type of computer system, domain, applications and infrastructure details etc. In addition, there exist relationships between nodes that are domain-independent.

Figure 2:
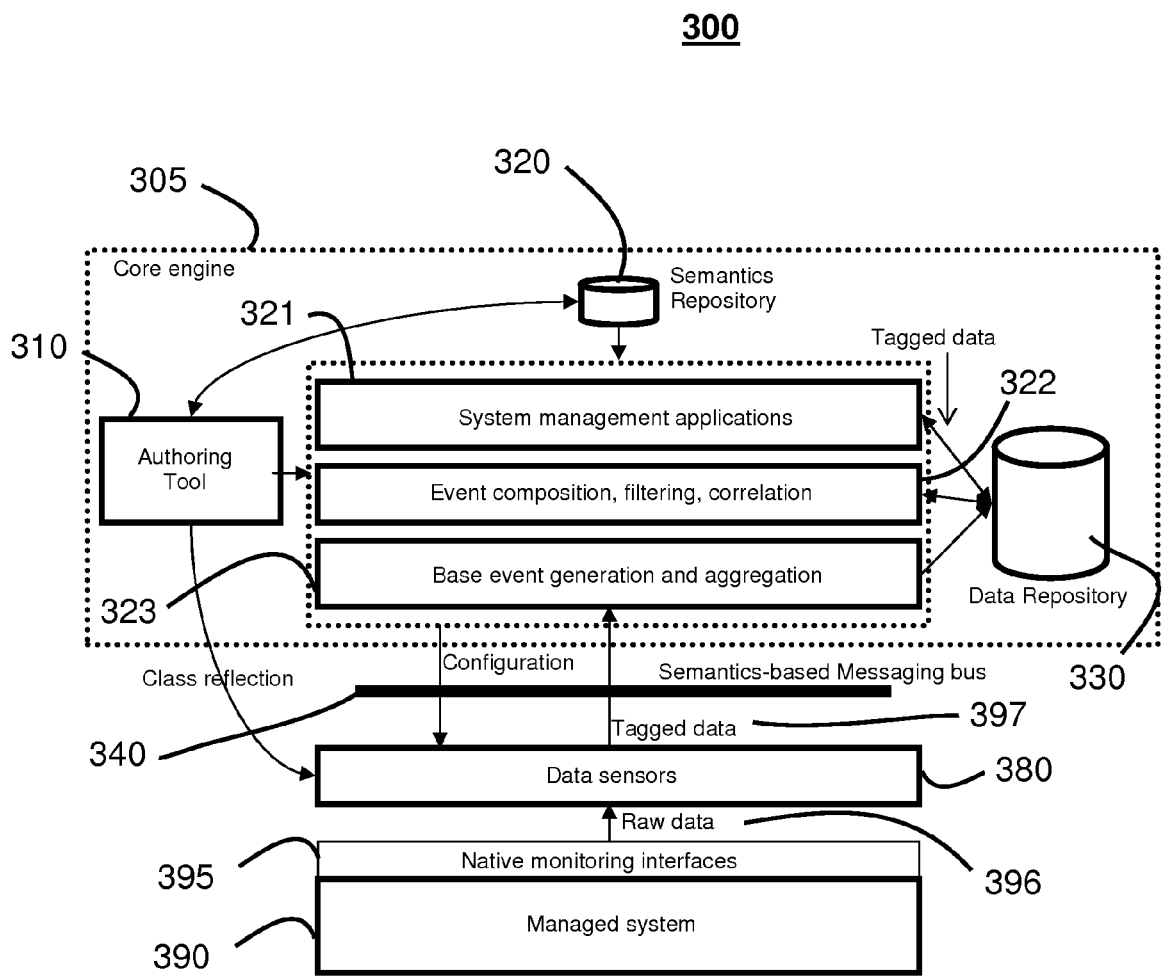
FIG. 2 shows a schematic block diagram of the architecture of a management system according to the present disclosure.

FIG. 2 shows a schematic block diagram of the architecture of a management system 300 according to the present disclosure. The management system 300 includes a data sensors layer 380 that interfaces with a managed system 390 through native monitoring interfaces 395 to collect raw data 396.

In the management system 300, metrics and relationships between nodes are captured by using core semantics. The following types of core semantics are embodied by the management system 300:

Latency at a node;
Throughput at a node;
Queue size at a node;
Queue drop rate at a node;
Arrival rate at a node;
Availability of a node;
Availability of connectivity between two nodes;
Availability of the data sources of a node;
Errors in a node; and
Utilization of a node.

Metric relationships may involve one or more nodes. For example, when a node is unavailable the backlog queue sizes increase. As another example, when throughput increases, the response time may also increase during an unstable period.

Component relationships involve two or more nodes. As examples, an application is 'installed on' a machine, and an application server 'accesses' a back-end database.

In view of the foregoing, the core semantics thus define:
the allowed parameters that may be associated with data;
the allowed processing that may be performed on the data; and
the allowed compositional rules that may be defined on the data.

A large amount of processing logic implemented by components within the management system 300 is based on the core semantics. Unlike existing management systems, the storage, reporting and processing logic in the management system 300 is explicitly based on the core semantics. This allows the core semantics to be reused easily across multiple domains. Core semantics are rarely updated as they are based on domain-independent principles.

However, the semantics in the management system 300 are not limited to the set of core semantics. This is because specific processing, reporting, and storage requirements arise when applied in different practical managed system environments. For example, new infrastructure components and applications may have specific requirements from the managed system 390. In addition, the component within the managed system 390 that is monitored has to be uniquely identified. In the management system 300 core semantics are templates which need to be "instantiated" by adding unique identification thereto. For example, to differentiate latency of component A and latency of component B in the management system, and by "filling" in the parameters, the latencies may be measured at different rates, and in different manners, in the different components A and B.

The management system 300 allows 'extension semantic tags' to be created along with new components. Each particular instance of a node can extend a core semantic tag by identifying the domain-specific parameter values and by adding a unique identification thereto. For example, if a new data sensor is created in the data sensor layer 380 for measuring the latency of an order management application in the context of a service provisioning business function, new semantics need to be created that recognize 'service provisioning' and 'order management' beyond the 'latency' defined by the core semantic. These extension semantic tags created by the data sensors 380 create particular instances of the core semantic tags. Relationships can also have extended domain-specific semantics attached to them, thus making the rules part of extended semantics.

Ideally, any existing management system component is able to incorporate new components, such as a new data sensor, and additional semantics are formed through mere template configuration. Hence, ideally no lower level programming is required. In the above example, as the new latency sensor is added, a traditional management system has to be programmed at various places, such as event generation, reporting, visualization, storage etc., to recognize the domain-specific extension semantics because, unlike the management system 300 according to the present disclosure, the framework itself provides no support.

Referring again to FIG. 2, the data sensors in the data sensor layer 380 are responsible for creating semantic tags and attaching the semantic tags to the raw data 395 to thereby form tagged data 397. An important feature of the management system 300 according to the present disclosure is that it maintains the semantic tags throughout the life cycle of the data. A core engine 305 of the management system 300 processes the tagged data 397 based on the semantics tags. Therefore, the management system 300 can be said to be based on core semantics, with the ability to incorporate extended semantics with localized programming.

The core engine 305 of the management system 300 includes a base event generation and aggregation layer 323 for processing the tagged 397 in order to compute aggregate data and/or to generate base events. The base events and aggregate data may be stored in a data repository 330. The core engine 305 further includes an event composition filtering and correlation layer 322, which filters and composes events based on pre-defined rules to generate composite events, and system management applications 321. The layers 321 and 322 use the data in the repository 330.

The core semantics are understood by the core engine 310. That is, the core engine 310 is pre-programmed with domain-independent processing logic based on the core semantics. It is the data sensors 380 that create the extensions to the core semantics by uniquely identifying themselves (and their associated parameters). Each data item collected by a particular data sensor 380 is tagged with this extended semantic information. Thus, when data with a particular core semantic tag is available, the core engine 310 is able to uniquely operate on the data.

The core engine 305 further includes an authoring tool 310 which is used to capture monitoring specifications by maintaining a mapping table (not illustrated) stored in a semantics repository 320.

The data sensors 380 are preferably programmed using the Java programming language. The classes implement reflection support so that the authoring tool 310 can query the data sensors 380 and create configuration templates when instances of the data sensors 380 are created corresponding to different monitoring specifications. Thus, domain-specific programming is limited only to the data sensors 380 and externalized through templates to the core engine 305.

Figure 1:
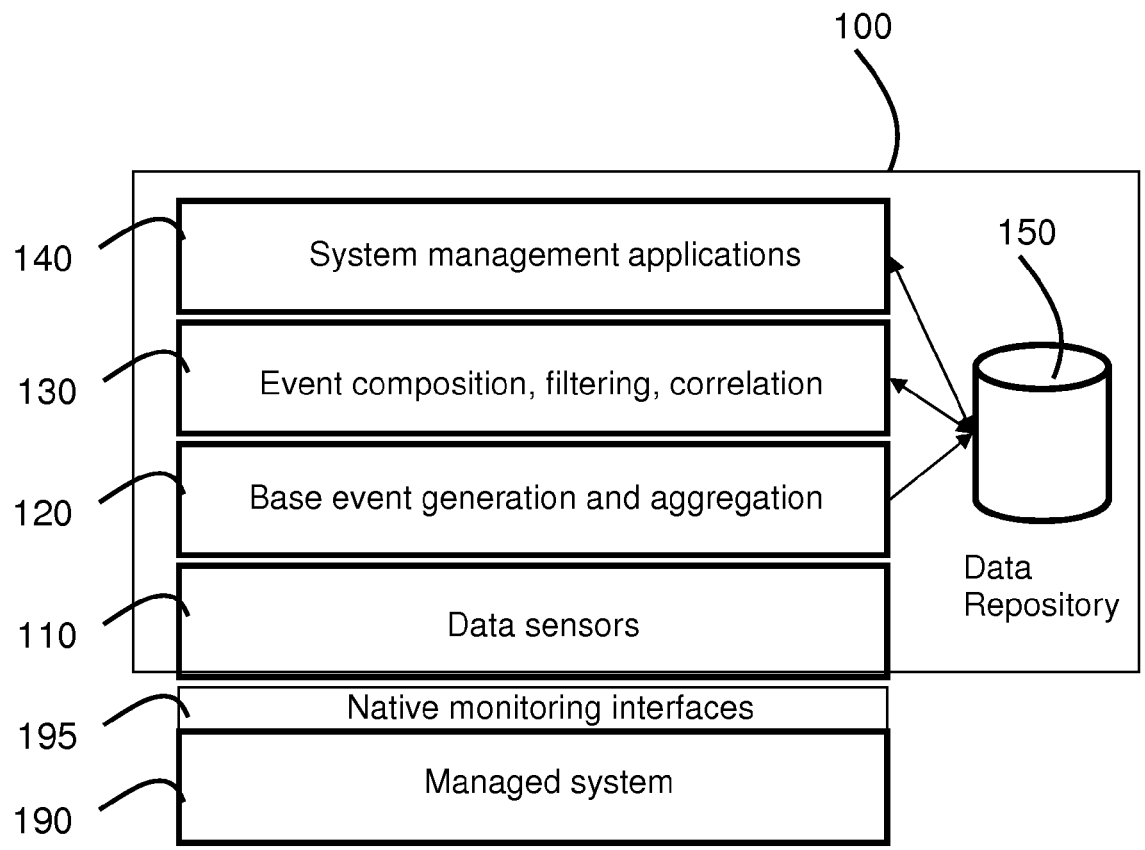
FIG. 1 shows a schematic block diagram of a typical architecture of a management system for a managed system.

A messaging bus 340 is provided, which is a topic-based publish-subscribe system that uses the semantic tags to route tagged data 397 from the sensor layer 380 to the appropriate core engine components 321, 322 and 323. The publish-subscribe messaging system thus serves as the backbone to connect the core engine 305 to the data sensors 380. Unlike the case in the traditional architecture shown in FIG. 1, since each piece of monitoring data in the architecture of FIG. 2 is received through the publish-subscribe system and each piece of data/event stored in the data repository 330 is tagged, the core engine layers 321, 322 and 323 use the core and extended semantics from the semantics repository 320. Domain-specific programming is thus limited to the data sensor layer 380.

Besides the flow of tagged data 397 into the core engine 305, the publish-subscribe messaging system also ensures a plug and play interface to add and organize new monitoring data semantics and corresponding data sensors 380. The architecture of FIG. 2 uses the concept of 'reflection' on new sensors so that programming within the core engine 305 is a matter of filling in templates.

The mapping table has two fields: <semantic> and <data sensor>. The <semantic> field has values 'core' or 'extended', whereas the field <data sensor> identifies the sensor classes used to capture the raw data 396. Both fields together form the key to the mapping table. Any new monitoring objective is an instance of the semantics stored in the mapping table.

If a semantic tag is not present in the mapping table, then that semantic and its corresponding data sensor 380 have to be entered into the mapping table. This leads to additional programming in terms of adapting any new data sensor 380 to tag its data 396 with semantics. Therefore, localized programming is required when existing templates are not sufficient to create monitoring specifications.

The authoring tool 310 captures monitoring specifications by first checking the mapping table for any existing semantic tag that may be extended to create a new monitoring specification. If such an existing semantic tag is found, the new monitoring specification is created by the authoring tool 310 providing to a user a template. The template allows the user to extend the existing semantic tag, thereby associating a unique semantic tag with the data and events relevant to the new monitoring specification. The authoring tool 310 then performs reflection on the core engine classes that implement core semantics to provide a template to the user to fill up domain-independent parameters of the new specification. The authoring tool 310 also performs reflection on the data sensor classes to provide a template to the user to fill up domain-specific details of the new specification.

Next, the authoring tool 310 checks the rule base to determine whether any existing rule template applies to the semantic tag in the new monitoring specification. If such an existing rule template is applicable, the rule template is provided to the user to fill up domain-specific details. The authoring tool 310 finally saves the complete specification inside the semantic repository 320 and the configuration flow of the new monitoring specification is invoked.

Alternatively, in the case where the authoring tool 310 does not find an existing semantic tag in the mapping table that may be extended to create the new monitoring specification, a new semantic tag is created before the new monitoring specification can be created in the manner described above. The new semantic tag is created by firstly programming the data sensor 380 based on given abstract methods and interfaces, and assigning to the data from that data sensor 380 a core semantic tag. Next, an entry is inserted into the mapping table with the core semantic tag and sensor class names. Rules are then created to relate the new semantic tag with any existing semantic tags in the mapping table.

Once the new semantic tag and rules have been created, a semantic tag exists in the mapping table which may be extended to create the new monitoring specification. The new monitoring specification is created in the manner described above.

Accordingly, each data sensor 380 creates an instance of a core semantic by uniquely addressing itself, gathers the instances of the parameters that are associated with the component of the managed system 390 being monitored, "reflects" these parameters to the higher levels 321, 322 and 323, and publishes its data, along with a unique tag that identifies the core semantics, and the particular instance associated with the data sensor 380.

As an embodiment, semantic tags of monitoring data may represent the following information:

Core semantics:
Domain-independent node monitoring parameters in the computer system;
Domain-independent node relationships in the computer system; and
Domain-independent metric relationships in the computer system.
Extended semantics:
Business functions the data is collected/processed for;
Application/System component type the data is collected from;
Instance of the application/system component the data is collected from;
Instances of metric relationships; and
Instances of node relationships.

The semantics of any data item flowing through the management system 300 is preferably represented using hierarchical tags. For example, the following tag format is an embodiment of a hierarchical semantic tag:

<metric type T>/<business function F>/<application component C>/<component instance I>

The hierarchical semantic tag uniquely identifies a monitoring data record for instance I of a component that is being monitored, where I belongs to an application component C, which is being monitored in the context of business function F. The metric type of monitoring data or the core semantic is T.

Consider the example hierarchical semantic tag:
latency/provisioning/ordermanagement/server1

The example tag is attached to latency data collected from an 'ordermanagement' application running on 'server1' in the context of a 'provisioning' function. By publishing the latency data along with the unique tag, the higher levels 321 are able to recognize the particular instance of data.

It is noted that the prefixes <T>, <F>, <C>, and <I> themselves may be hierarchies. Hierarchical semantic tags may share prefixes leading to the formation of semantic trees.

Analytics modules and tools (not illustrated) that consume the raw data 396 may generate higher level events which have tags that are a function of the tags attached to the consumed raw data 396. For example, an analytics module may consume system component instance level availability information, with tags of the form <T>/<F>/<C>/<I>, and may generate business function level availability events with tags of the form <T>/<F>. In this case, the analytics module internally implements aggregation functions to summarize information in a hierarchy.

Each data source performs tagging of data. As another example, an aggregator may consume tagged data originating from multiple other data sources, and produce from the consumed tagged data aggregate data. The tag added to the aggregate data capture that aggregation has been performed.

Relationships between nodes connect semantic tags and different levels of hierarchy. The semantic tags also convey the inter-relationships between nodes. For example, the symbolic entities "/availability", "/availability/resource" and "/availability/resource/port" convey the fact that the first entity is the general one, the second is a specialization of the first and the third a further specialization.

Figure 3:
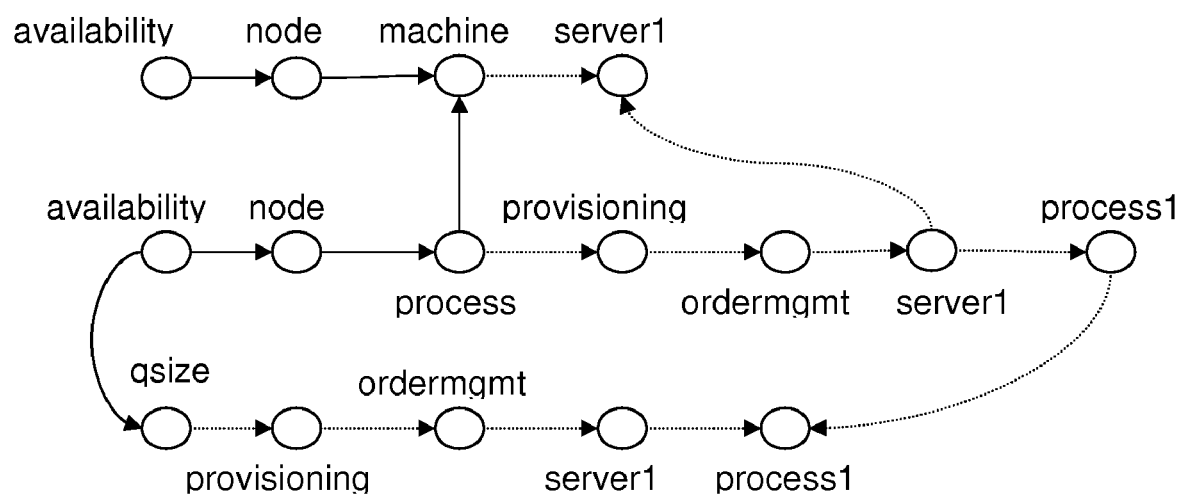
FIG. 3 shows an example of semantic tags and their relationships.

FIG. 3 shows an example of semantic tags and their relationships. The cross-edges capture only first order relationships, i.e. involving only a pair of nodes, and are meant for graphical illustration. In general relationships involving more than two nodes are possible and are represented using logical rules and attributes.

In FIG. 3 the solid edges represent core semantics and the dotted edges are extension semantics which may be instances of the core semantics. For example, the solid edge connecting the nodes 'availability', 'node' and 'machine' represent the core semantic 'availability/node/machine'. The dotted edge between the nodes 'machine' and 'server1' extends the core semantic 'availability/node/machine' to 'availability/node/machine/server1', thereby specifying that the particular instance of the core semantic results from a machine named 'server1'. Also, the cross edge between the 'process' and 'machine' nodes implies that a process is installed on the machine. A relationship 'installed on' between a process and a machine is a core semantic and can be represented using an attribute dependency graph, where 'installed on' is an attribute. An instance of such a core semantic is the installation of a process called 'process1' on the machine 'server1'. Similarly, availability of a process relates to queue size, because if a process is down, then its corresponding queue also increases as requests wait to be serviced. This relationship can be represented using a logical rule. Hence, in the semantics representation of FIG. 3 tags on data directly represent the meaning of the data at multiple levels.

Figure 4:
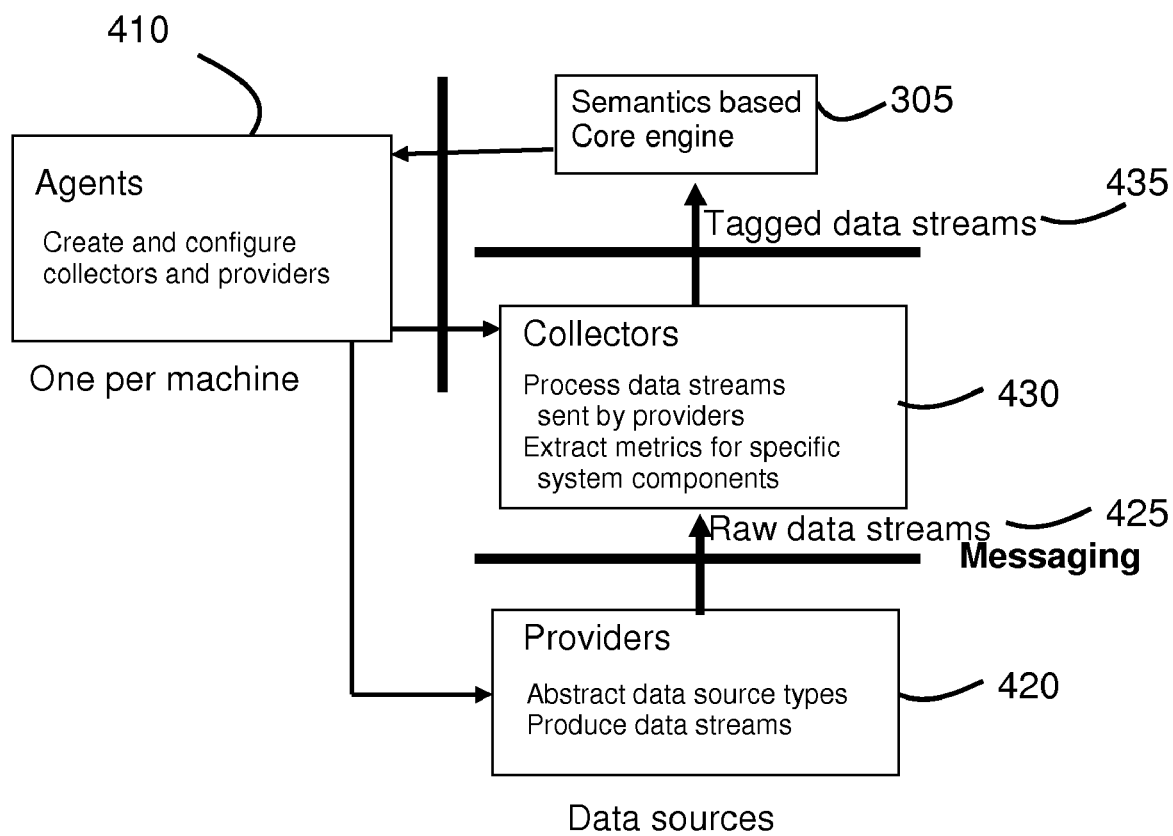
FIG. 4 shows an agent based data sensor architecture.

Referring again to FIG. 2, the data sensor layer 380 may be layered for code reusability. FIG. 4 shows an agent based data sensor architecture. The data sensor layer 380 is split into two layers, called providers 420 and collectors 430. Each provider 420 is a layer within the data sensor layer 380 which is closer to the native monitoring interfaces 395, and encapsulates logic to access lower layer interfaces, such as file system, database, OS shell commands etc, and generates data streams 425 for the collectors 430. The collectors 430 process the data streams 425 and generate tagged data streams 435 for use by the core engine 305.

Providers 420 need to be created when new native monitoring interfaces 395 are introduced. New collectors 430 have to be created when the raw data stream 425 from the provider 420 is to be processed in a domain-specific manner to generate the tagged data stream 435 for use by the core engine 305. Collectors 430 and providers 420 are generalized, wherever possible, to reduce the data sensor layer 380 programming cost. New providers 420 and collectors 430 are easily added as long as they support the defined interfaces 395 and implement abstract class methods.

An agent 410 is installed on each physical computer. When the authoring tool 310 creates a new monitoring specification, the core engine 305 creates a state within its own layers 321, 322 and 323 for processing the tagged data 435 and creates new instances of data sensors 380 (providers 420 and collectors 430) on corresponding computers. The instance creation is done through the per-computer agents 410 which always listen to a "well-known" configuration channel for configuration messages published by the core engine 305. The configuration messages contain commands to create and delete instances of data sensors 380 with proper sensor configurations entered through templates in the authoring tool 310.

The core engine 305 initializes its internal processing logic that is relevant to the core semantics of the monitoring specification, and publishes the configuration for the data sensors 380 to collect data and routes the tagged 397 data to the corresponding logic in the core engine 305. The relevant agents subscribe to the configurations and instantiate the corresponding data sensors.

Figure 5:
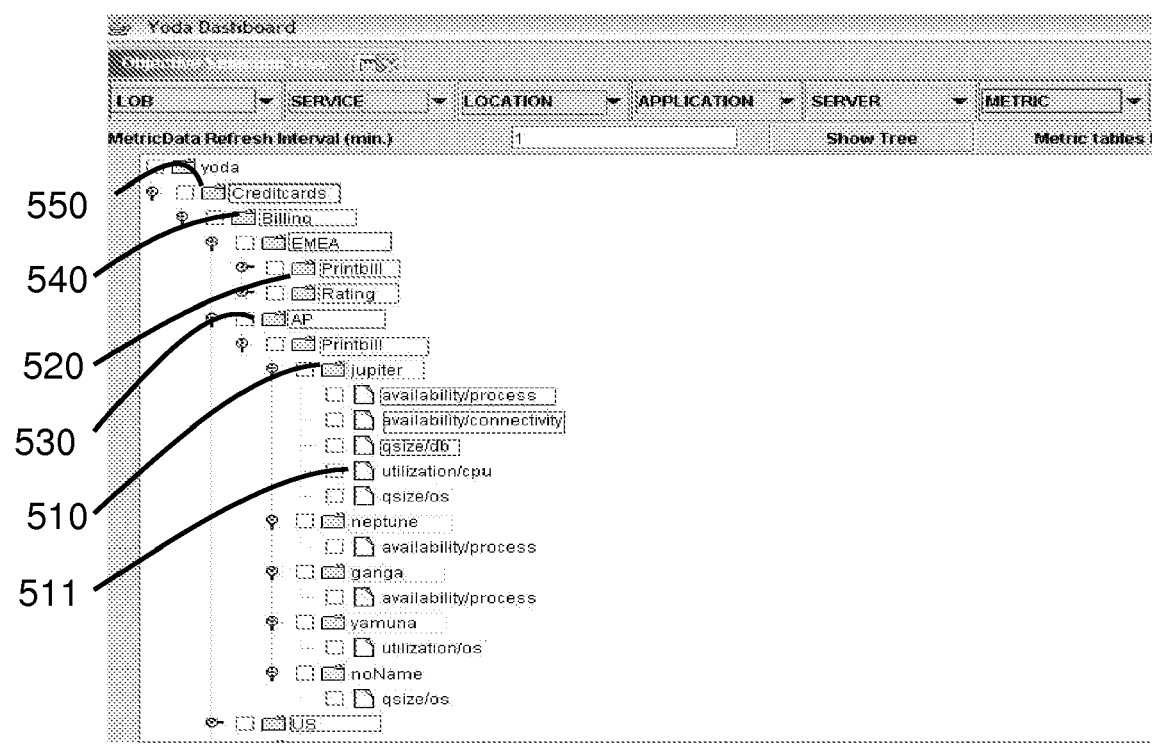
FIG. 5 shows an example visualization application screenshot where all measurement data and statistics are displayed in the context of a semantics hierarchy.

The semantic repository 320 (FIG. 3) may be displayed using a visualization application. FIG. 5 shows an example visualization application. In particular, the end-to-end system state, i.e. events and statistics, of the example semantics repository is shown. Semantic tags are used to hierarchically organize the data in the repository. Events and statistics are associated with nodes in the hierarchy. Based on the node in the hierarchy, a user can view the corresponding system state.

More particularly, FIG. 5 shows a visualization application for monitoring the infrastructure and applications of a financial sector enterprise. There are 6 possible meta-data tags attached to each monitoring objective. For example, one objective measures the 'CPU utilization' 511 of the 'jupiter' server 510, which hosts the 'PrintBill' application 520 for 'AP' region 530 and is part of the 'Billing' service 540 in 'CreditCards' Line-Of-Business 550. The CPU utilization statistics 511, snapshot and historical trends, are attached to the leaf node labelled 'yoda/CreditCards/Billing/AP/PrintBill/jupiter/utilization/cpu'. Aggregated statistics can be attached to internal nodes of the tree. The entire tree can be reorganized when the 6 meta-data types are reordered to appear at different levels of the 6-level tree. Thus a business tier person can view the system at a service level whereas an infrastructure tier person can reorganize the same data at server level. The tags allow one to project and organize the data in various ways.

An advantage of the proposed architecture shown in FIG. 2 is that it provides for localization of programming effort to the data sensor layer 380. The ability to extend the core semantics in a structured manner simplifies the programming model within the management system 300 and ensures reusable logic. As long as a part of the semantics is applicable to a new domain, the logic that deals with such level of semantics can be reused and only specifics of the domain logic needs to be programmed.

The semantic tags may be expressed in the form of set of ontology trees and a set of rules that capture relationships between nodes in different trees. In the present disclosure, ontology trees are created to capture the semantics of monitoring metrics, business functions, and application components. Rules capture relationships between metrics and relationships between application components. New semantic tags may be defined by enhancing the ontology trees and/or the rules.

The foregoing describes only some embodiments of the present invention, and modifications and/or changes can be made thereto without departing from the scope and spirit of the invention, the embodiments being illustrative and not restrictive.

We claim:

1. A management system for a managed system, said management system comprising:
   a computer hardware processor, said hardware processor computing:
      a plurality of data sources, each data source interfaces with said managed system using a data sensor that collects data and attaches a hierarchical semantic tag to said collected data, said hierarchical semantic tag conveying information of:
         hierarchy information;
         a set of ontology trees that capture semantics comprising:
            monitoring metric relationships data;
            business functions data; and
            application components data; and
         a set of rules that capture relationships between hierarchical semantic tag hierarchies, relationships between nodes in different trees, relationships between metrics and relationships between application and business context of components monitored by said data sources; and
      a core engine that receives said data including said hierarchical semantic tag, and that performs domain-independent processing on said data based upon at least a portion of said hierarchical semantic tag, said core engine further comprising:
         a base event generation and aggregation layer that processes said hierarchical semantic tag to generate base events;
         an event composition filtering and correlation layer, that filters and composes said base events based on pre-defined rules to generate composite events; and
         an authoring tool for receiving from a user new hierarchies, and associations between hierarchical semantic tags and data sources,
      wherein said hierarchical semantic tag is associated with monitoring data, and is used by said managed system to apply management-specific functions to said data at a data center.

2. The management system according to claim 1, wherein said portion of said hierarchical semantic tag represents domain-independent monitoring metrics.

3. The management system according to claim 2, wherein said portion of said hierarchical semantic tag further identifies an application and business context of said data source that generated the associated data.

4. The management system according to claim 1, wherein said hierarchical semantic tag includes parameters, and said core engine further performs domain-specific processing on said data based upon said parameters.

5. The management system according to claim 1, wherein said core engine includes one or more processing modules, and said hierarchical semantic tags are used for routing said data to said processing modules.

6. The management system according to claim 5, wherein said routing is via a publish-subscribe messaging backbone.

7. The management system according to claim 1, wherein said data sources are layered, and each data sensor instantiates an unique sensor logic.

8. The management system according to claim 1, wherein said core engine includes a data repository for storing data and associated hierarchical semantic tags.

9. The management system according to claim 1, wherein said data includes event data.

10. The management system according to claim 1 further comprising a visualization application for viewing the end-to-end system state of said management system by displaying data associated with each hierarchical semantic tag, wherein said hierarchical semantic tags are displayed in a hierarchical manner.

11. A method within a management system, said method comprising:
    attaching a hierarchical semantic tag to data collected by a data sensor of a managed system, each hierarchical semantic tag conveying information of:
       hierarchy information;
       a set of ontology trees that capture semantics comprising:
          monitoring metric relationships data;
          business functions data; and
          application components data; and
       a set of rules that capture relationships between hierarchical semantic tag hierarchies, capture relationships between nodes in different trees, relationships between metrics and relationships between application and business context components monitored by said data sources; and
    upon receipt of said data including said hierarchical semantic tag, performing domain-independent processing on said data based upon at least a portion of said hierarchical semantic tag further comprising:
       processing said hierarchical semantic tag to generate base events;
       filtering and composing said base events based on pre-defined rules to generate composite events; and
       an authoring tool for receiving from a user new hierarchies, and associations between hierarchical semantic tags and data sources, associating said hierarchical semantic tag with monitoring data; and
    using said hierarchical semantic tag by said managed system to apply management-specific functions to said data at a data center.

12. The method according to claim 11, wherein said portion of said hierarchical semantic tag represents domain-independent monitoring metrics.

13. The method according to claim 11, further comprising receiving from a user new hierarchies, and associations between hierarchical semantic tags and data sources.

14. The method according to claim 11, wherein said hierarchical semantic tag includes parameters, and said method further comprises performing domain-specific processing on said data based upon said parameters.

15. The method according to claim 11, further comprising routing said data to specific processing modules based upon said hierarchical semantic tags.

16. The method according to claim 11, wherein said routing is via a publish-subscribe messaging backbone.

* * * * *